United States Patent
Vornehm

(10) Patent No.: US 6,862,510 B2
(45) Date of Patent: Mar. 1, 2005

(54) METHOD OF CONTROLLING AN AUTOMATED TRANSMISSION OF A VEHICLE

(75) Inventor: Martin Vornehm, Buhl (DE)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 10/688,282

(22) Filed: Oct. 17, 2003

(65) Prior Publication Data
US 2004/0087415 A1 May 6, 2004

Related U.S. Application Data

(63) Continuation of application No. PCT/DE02/01397, filed on Apr. 15, 2002.

(30) Foreign Application Priority Data
Apr. 20, 2001 (DE) .......................................... 101 19 360

(51) Int. Cl.[7] .............................................. F16H 59/14
(52) U.S. Cl. .............................. 701/51; 701/56; 701/58; 477/97; 477/120; 180/338
(58) Field of Search ............................. 701/51, 55, 56, 701/57, 58, 68; 477/97, 120; 180/338

(56) References Cited

U.S. PATENT DOCUMENTS

| | | | | |
|---|---|---|---|---|
| 4,551,802 A | * | 11/1985 | Smyth | 701/55 |
| 5,390,117 A | * | 2/1995 | Graf et al. | 701/57 |
| 5,957,990 A | * | 9/1999 | Graf et al. | 701/57 |
| 6,012,009 A | * | 1/2000 | Kronenberg et al. | 701/56 |
| 6,220,987 B1 | * | 4/2001 | Robichaux et al. | 477/97 |
| 6,308,124 B1 | * | 10/2001 | Kresse et al. | 701/53 |
| 6,311,114 B1 | * | 10/2001 | Graf et al. | 701/57 |

FOREIGN PATENT DOCUMENTS

| | | |
|---|---|---|
| DE | 196 11 839 A1 | 10/1997 |
| DE | 197 26 724 A1 | 11/1998 |
| DE | 199 37 455 A1 | 4/2000 |
| EP | 1040956 A1 * | 10/2000 ........... B60K/41/10 |
| EP | 1 078 805 A1 | 2/2001 |

* cited by examiner

Primary Examiner—Michael J. Zanelli
Assistant Examiner—Eric M. Gibson
(74) Attorney, Agent, or Firm—Darby & Darby

(57) ABSTRACT

A method of controlling an automated transmission of a motor vehicle, wherein the degree of accelerator-pedal depression is expressed as a pedal-depression value and a gear-shifting strategy is determined based on one or more shift characteristics, includes the steps of:

- determining the pedal-depression value and/or the amount of torque demanded by the driver,
- evaluating the shift characteristics by taking the pedal-depression value and/or driver-demanded torque into account as input quantities for the evaluation, and
- determining the gear-shifting strategy based on the evaluation.

11 Claims, 1 Drawing Sheet

METHOD OF CONTROLLING AN AUTOMATED TRANSMISSION OF A VEHICLE

CROSS-REFERENCE TO RELATED APPLICATION

This application is a continuation of International Patent Application Serial No. PCT/DE02/01397, filed Apr. 15, 2002, published in German, which is hereby incorporated by reference in its entirety.

BACKGROUND OF THE INVENTION

The invention relates to a method of controlling and/or regulating an automated transmission of a vehicle, in particular a motor vehicle, with a gear-shift strategy that is determined on the basis of at least one shift characteristic which may be represented graphically as a curve.

The known state of automotive technology includes in particular automated transmissions that provide the possibility of automating the power train of a vehicle.

Under a known method used in the power plants of state-of-the-art motor vehicles, a suitable gear-shift strategy is carried out on the basis of a shift characteristic. According to the known method, the gear-shift strategy normally follows a shift characteristic that is designed so that the engine delivers a strong torque already with a slight actuation of the accelerator pedal in order to give the driver the impression of a sport-oriented vehicle response. As a consequence, when the driver subsequently depresses the accelerator pedal more strongly, the engine torque can only be increased by a small additional amount.

Thus, when the driver indicates a desire to accelerate the vehicle, it is possible with the prior-art-method that the transmission shifts too early into a higher gear, or in case of a low engine torque and an indication that a smaller amount of acceleration is requested, a lower than required gear-ratio may be maintained too long. Overall, this behavior of the transmission has an unfavorable effect on fuel consumption in a vehicle where the prior-art method is used.

Furthermore, up-shifts under less than full engine power with small amounts of pedal depression can lead to an undesirable oscillating shift behavior of alternating up- and down shifts. Under the gear-shift strategy of the prior-art method it is possible, e.g., that under full engine torque with an intermediate amount of pedal depression, the transmission is kept in a low gear for too long, or it is possible that a downshift fails to occur with a kick-down depression of the accelerator pedal and a high engine torque. Accordingly, it is possible that a tip-in (slight, rapid actuation of the gas pedal) at a low engine rpm-rate will cause an unwanted downshift due to the aggressive engine behavior, even though the accelerator pedal has been depressed only slightly.

As a result, the gear-shift strategy in the state-of-the-art methods is unpredictable for the driver. Overall, this lowers the comfort level of the driver in a vehicle where the state-of-the-art method is used to control the transmission.

OBJECT OF THE INVENTION

The invention therefore has the objective to propose a method of controlling an automated transmission of a motor vehicle where the gear-shift strategy is further optimized and the aforementioned disadvantages are avoided.

SUMMARY OF THE INVENTION

According to the invention, a method that solves the aforementioned problems in the control of an automated transmission of a vehicle, in particular a motor vehicle, uses a gear-shift strategy that is determined by way of at least one shift characteristic. In the process of evaluating the shift characteristic to determine the gear-shift strategy, at least one pedal-depression value and/or a driver-demanded torque are taken into account. The term "driver-demanded torque" means an amount of engine torque that is calculated by the engine control unit as a function of pedal depression, engine rpm-rate, temperature, and other variables.

In other words, the invention proposes a method in which the gear-shift strategy is determined by evaluating at least one shift characteristic which may be represented in a graphic format as a characteristic curve or in any other suitable format for expressing a functional relationship, wherein appropriate input quantities are used in the evaluation. An optimized gear-shift strategy can be established in particular by taking a pedal-depression value and a driver-demanded torque level into account. Overall, this concept increases the stability of the tuning of the automated transmission so that it is less sensitive to changes in the engine characteristic of the vehicle. The inventive method further makes the correlation between acceleration and gear-shift strategy considerably more stable.

In particular in a vehicle with an electronically controlled throttle, the amount of torque demanded by the driver can be taken into account more strongly and with a higher degree of reproducibility when selecting a gear. Thus, the method according to the invention ensures that an optimally suited gear-shifting strategy is being followed.

In a further developed version of the invention, the method uses a strategy where the gear selection is determined by shift characteristics and where the input quantity is, e.g., a mixed quantity composed of at least one pedal-depression value and at least one driver-demanded amount of torque. Of course, one could also use other input quantities in the inventive method in order to further optimize the method.

According to a further developed version of the invention, it is particularly advantageous if the mixed quantity that is used in the gear-shifting strategy in the presence of a strong pedal-depression depends substantially on the pedal-depression value, and with a weak peal depression depends substantially on the driver-demanded amount of torque. It is also conceivable that in the method according to the invention the mixed quantity depends on other input quantities and/or parameters, and that the mixed quantity can be changed in a suitable manner in order to ensure that an optimally suited gear-shifting strategy is followed under the inventive method.

In particular with the concept of using the driver-demanded amount of torque as an input quantity, the driver's wish is sufficiently taken into account in the determination of the gear-shifting strategy under the inventive method. Accordingly, a mixed quantity is determined which, e.g., at large pedal depressions uses the pedal position as a significant indication for the driver's wish, while with small pedal depressions the driver-demanded amount of torque predominates in determining the mixed quantity of course, one could also use other suitable correlations between the gear-shifting strategy and the influence factors in the method according to the invention.

In another further developed version of the inventive method, the mixed quantity can be used as the argument (independent variable of the shift characteristic), e.g., in the evaluation of one or more shift characteristics and thus replace the pure pedal-depression value or other influence factor quantity as the argument quantity of the functional relationship.

According to a preferred embodiment of the present invention, the mixed quantity as an argument quantity can be determined by the following equation:

$$A = PW \text{ for values of } PW > PW\_MAX, \text{ wherein}$$

PW represents the pedal-depression value in %,
A represents the argument quantity, and
PW_MAX represents the maximum pedal-depression value in %.

The maximum pedal-depression value indicates the limit up to which the engine torque is allowed to have an influence in the gear-shifting strategy of the inventive method. For pedal-depression values below the given maximum pedal-depression value, the mixed quantity can be determined, e.g., according to the following equation:

$$A = PW \times (PW\_MAX - PW) \times (MM - PW)/\text{DENOMINATOR} + PW, \text{ wherein}$$

DENOMINATOR represents a parameter that determines the degree of influence of the engine torque,
MM represents the driver-demanded torque in %,
A represents the argument quantity,
PW represents the pedal-depression value in %, and
PW_MAX represents the maximum pedal-depression value in %.

The foregoing equation can be used in the inventive method in all cases where the pedal-depression value is smaller than the maximum pedal-depression value. Of course, the equations above can be modified in a suitable manner in order achieve an overall improvement in the method according to the invention.

The parameter named DENOMINATOR indicates the amount of influence that the engine torque has in the determination of a suitable gear-shifting strategy. Of course, it is also conceivable to use other parameters in the inventive method, e.g., to modify the influence of the torque in a suitable manner.

It is possible to evaluate in particular traction torques in determining the amount of torque demanded by the driver (as opposed to drag torques which occur, e.g., when traveling downhill using the engine for braking). Of course, one could also take other kinds of torque into account in determining the amount of torque demanded by the driver.

According to another further development of the invention, it is particularly advantageous if a value around 70 is used for the maximum pedal-depression value. Of course the value of about 70 represents only an example. It is absolutely conceivable to also use other suitable percentage values for the maximum pedal-depression value in the method according to the invention.

A preferred value for the parameter named DENOMINATOR in the method according to the invention is 3.000. In this case again, the value of 3.000 should be understood to represent an example, so that the value can of course be varied in a suitable manner in order to achieve a further overall optimization of the method according to the invention.

The method according to the invention can be used in automated shift transmissions as well as in transmissions with an automated clutch. Of course, the method can also be used in other transmission systems.

The inventive concept of calculating an argument that represents a mixed quantity derived from a pedal-depression value and an amount of torque demanded by the driver can also be of advantage in transmissions with a continuously variable transmission ratio such as, e.g., cone-pulley transmissions, friction-wheel transmissions, toroid transmissions, and the like. With these transmissions, a control is proposed where the target rpm-rate of the engine is controlled as a function of the argument quantity and the vehicle speed, rather than controlling the gear change as a function of the argument quantity and the vehicle speed.

A mixed quantity A can further include a braking torque, based for example on an evaluation of the signal of a brake-fluid pressure sensor of the kind that is normally provided in the control of an anti-lock braking system and whose signal is transmitted by way of a CAN (Central Area Network). To represent braking torque values, the value range of A is appropriately expanded into the negative without a discontinuity in the torque values. In the most elementary case, for example if there is no brake-fluid pressure sensor, the braking torque may be evaluated qualitatively based on an actuation signal of the brake, for example by means of a brake-light switch. Thus, the mixed quantity A can assume the following values:
$A \geq 0$ gas pedal applied;
$A = 0$ gas pedal not applied; brake light switch off;
$A \leq 0$ gas pedal not applied; brake light switch on, or a signal indicates pressure in the brake circuit.

BRIEF DESCRIPTION OF THE DRAWING

Preferred embodiments of the invention are described below based on the attached drawing FIG. 1, representing a three-dimensional graph in which the argument quantity is shown as a mixed quantity dependent on the torque MM demanded by the driver and the pedal-depression value PW.

DESCRIPTION OF PREFERRED EMBODIMENTS

Figure 1:
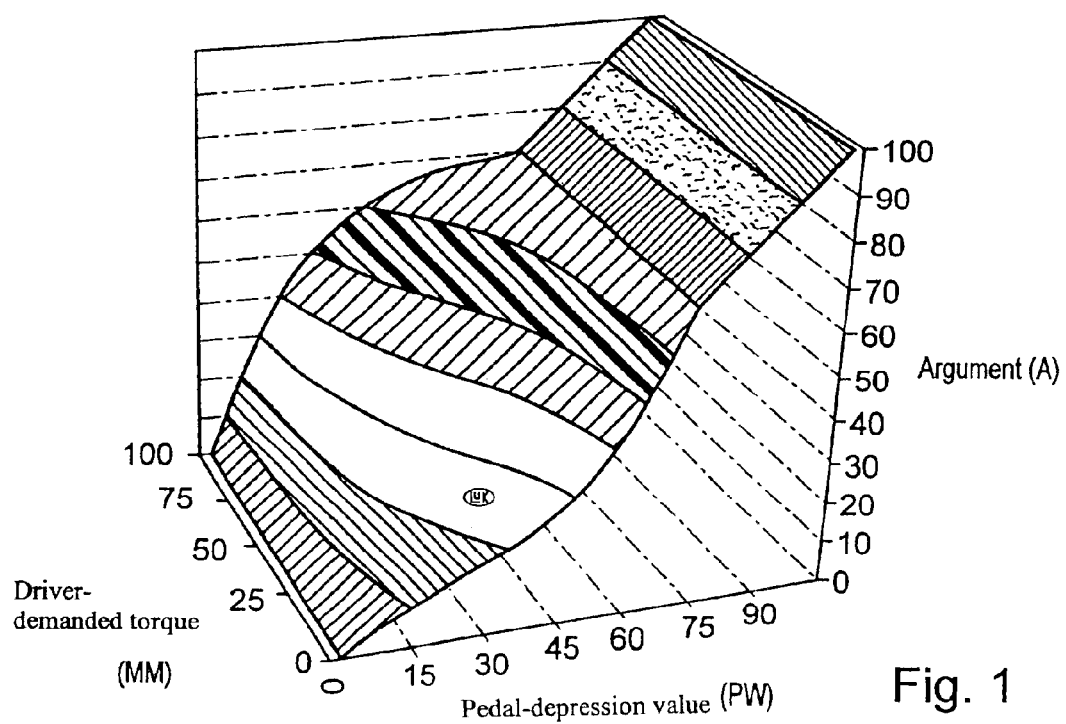

The three-dimensional graph in FIG. 1 shows the argument quantity measured along a vertical axis, while the two horizontal axes represent, respectively, the driver-demanded torque MM and the pedal-depression value PW.

The argument quantity A in this graph is a mixed quantity that is defined by the following equations:

$$A = PW \text{ for values of } PW > PW\_MAX, \text{ wherein}$$

PW_MAX represents the maximum pedal-depression value in %,
PW represents the pedal-depression value in %, and
A represents the argument quantity,
and further:

$$A = PW \times (PW\_MAX - PW) \times (MM - PW)/\text{DENOMINATOR} + PW, \text{ wherein}$$

DENOMINATOR represents a parameter that determines the degree of influence of the engine torque,
MM represents the driver-demanded torque in %,
A represents the argument quantity,
PW represents the pedal-depression value in %, and
PW_MAX represents the maximum pedal-depression value in %.

A value of 70 was chosen for the maximum pedal-depression value PW_MAX, which functions as a parameter in this graphic representation. A value of 3.000 was set for the parameter named DENOMINATOR. The three-dimensional profile of the mixed quantity in FIG. 1 is based on this parameter selection. By modifying the parameters in a suitable manner, the mixed quantity which is represented as the argument quantity in the method according to the invention can also be changed appropriately in order to adapt the gear-shifting strategy to a given situation.

What is claimed is:

1. A method of controlling an automated transmission of a motor vehicle having an engine controlled by an accelerator pedal whose degree of depression is expressed as a pedal-depression value, wherein a gear-shifting strategy of the transmission is determined based on at least one shift characteristic, said method comprising the steps of determining at least one of the pedal-depression value and a driver-demanded torque which is calculated by an engine control unit, evaluating the at least one shift characteristic by taking said at least one of the pedal-depression value and driver-demanded torque into account as an input quantity for said evaluation, and determining the gear-shifting strategy based on said evaluation, wherein said pedal-depression value and driver-demanded torque are taken into account by using a mixed quantity composed of the pedal-depression value and driver-demanded torque, and in said evaluation of the at least one shift characteristic, the mixed quantity is entered as an argument.

2. The method of claim 1, wherein the mixed quantity is composed so that the mixed quantity depends substantially on the pedal-depression value when the pedal-depression value is large, and the mixed quantity depends substantially on the driver-demanded torque when the pedal-depression value is small.

3. The method of claim 1, wherein the argument is determined by means of the equation:

$$A=PW \text{ for values of } PW>PW\_MAX, \text{ wherein}$$

PW_MAX represents a maximum pedal-depression value in %,

PW represents the pedal-depression value in %, and

A represents the argument.

4. The method of claim 3, wherein a value of substantially 70 percent is selected for the maximum pedal-depression value.

5. The method of claim 3, wherein the maximum pedal-depression value PW_MAX indicates a threshold value, so that for values of PW>PW_MAX the driver-demanded torque has no influence on the argument.

6. The method of claim 1, wherein the argument is determined by means of the equation:

$$A=PW \times (PW\_MAX-PW) \times (MM-PW)/DENOMINATOR+PW \text{ for values of } PW<PW\_MAX,$$

wherein

DENOMINATOR represents a parameter that determines a degree of influence of the engine torque, MM represents the driver-demanded torque in %, A represents the argument, PW represents the pedal-depression value in %, and PW_MAX represents a maximum pedal-depression value in %.

7. The method of claim 6, wherein the maximum pedal-depression value PW_MAX indicates a threshold value, so that for values of PW>PW_MAX the driver-demanded torque has no influence on the argument.

8. The method of claim 6, wherein the parameter DENOMINATOR determines said degree of influence of the engine torque in such a manner that a large value of DENOMINATOR is associated with a small degree of influence of the engine torque.

9. The method of claim 6, wherein a value of substantially 70 percent is selected for the maximum pedal-depression value.

10. The method of claim 6, wherein a value of substantially 3.000 is selected for the parameter DENOMINATOR.

11. The method of claim 1, wherein the driver-demanded torque is determined by taking traction torques into account.

* * * * *